(12) United States Patent
Umeda (10) Patent No.: US 11,411,446 B2
(45) Date of Patent: Aug. 9, 2022

(54) ARMATURE CORE OF ROTARY ELECTRIC MACHINE

(71) Applicant: Mitsubishi Electric Corporation, Tokyo (JP)

(72) Inventor: Takashi Umeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 399 days.

(21) Appl. No.: 16/495,109

(22) PCT Filed: May 11, 2017

(86) PCT No.: PCT/JP2017/017922
§ 371 (c)(1),
(2) Date: Sep. 18, 2019

(87) PCT Pub. No.: WO2018/207326
PCT Pub. Date: Nov. 15, 2018

(65) Prior Publication Data
US 2020/0144875 A1 May 7, 2020

(51) Int. Cl.
*H02K 1/16* (2006.01)
*H02K 1/08* (2006.01)
(Continued)

(52) U.S. Cl.
CPC .............. *H02K 1/165* (2013.01); *H02K 1/08* (2013.01); *H02K 1/146* (2013.01); *H02K 1/18* (2013.01);
(Continued)

(58) Field of Classification Search
CPC .......... H02K 1/165; H02K 1/08; H02K 1/146; H02K 1/18; H02K 15/022; H02K 15/024
(Continued)

(56) References Cited

U.S. PATENT DOCUMENTS

2007/0035199 A1\* 2/2007 Yamamoto et al. ..... H02K 1/18
310/269

FOREIGN PATENT DOCUMENTS

JP 50-124502 U 10/1975
JP 2005-261045 A 9/2005
(Continued)

OTHER PUBLICATIONS

International Search Report and Willen Opinion dated Jul. 18, 2017 for PCT/JP2017/017922 filed on May 11, 2017, 8 pages including English Translation of the International Search Report.
(Continued)

*Primary Examiner* — Elvin G Enad
*Assistant Examiner* — H Cho
(74) *Attorney, Agent, or Firm* — Xsensus LLP (57) ABSTRACT

Provided is an armature core of a rotary electric machine according to the present invention including a shoe provided as a separate part with respect to each magnetic pole tooth. An arc-shaped cutout is formed in a distal end of the magnetic pole tooth, and the shoe part includes a circular portion. Through fitting between the arc-shaped cutout and the circular portion, the magnetic pole tooth and the shoe part are coupled together. The shoe part is configured to be rotatable with respect to the magnetic pole tooth with a circumference of the circular portion serving as a guide.

6 Claims, 6 Drawing Sheets

(51) Int. Cl.
  *H02K 1/14*     (2006.01)
  *H02K 1/18*     (2006.01)
  *H02K 15/02*    (2006.01)

(52) U.S. Cl.
  CPC ......... *H02K 15/022* (2013.01); *H02K 15/024* (2013.01)

(58) Field of Classification Search
  USPC .................................................. 310/216.001
  See application file for complete search history.

(56)            References Cited

FOREIGN PATENT DOCUMENTS

| | | | | | |
|---|---|---|---|---|---|
| JP | 2009-284707 | A | * | 12/2009 | ............... H02K 1/16 |
| JP | 2011-244674 | A |   | 12/2011 | |
| JP | 2016-116879 | A | * | 6/2016  | ............... H02K 1/08 |
| JP | WO 2016/093267 | A1 | * | 6/2016 | |
| WO | 2016/093267 | A1 |  | 6/2016 | |

OTHER PUBLICATIONS

Office Action dated Dec. 3, 2020, in corresponding Chinese patent Application No. 201780090414.X, 12 pages.

* cited by examiner

ARMATURE CORE OF ROTARY ELECTRIC MACHINE

CROSS-REFERENCE TO RELATED APPLICATIONS

The present application is based on PCT filing PCT/JP2017/017922, filed May 11, 2017, the entire contents of which are incorporated herein by reference.

TECHNICAL FIELD

The present invention relates to a structure of an armature core to be used in a rotary electric machine, and relates to an armature core of a rotary electric machine capable of improving productivity of the armature core without impairing satisfactory operating characteristics of the rotary electric machine.

BACKGROUND ART

Hitherto, there has been known a rotary electric machine including an armature that is formed by winding a plurality of armature coils around a plurality of magnetic pole teeth of an armature core. The armature core includes a back yoke portion having an annular shape, and a plurality of magnetic pole tooth portions protruding from the back yoke portion at equal intervals. Spaces called slots are defined between the magnetic pole teeth, and the armature coils are received in the slots, respectively.

In order to prevent increase in iron loss caused by an eddy current, the armature core is formed of laminated steel sheets obtained by laminating thin-sheet-like core pieces. Further, it has been also known that characteristics of the rotary electric machine can be improved by providing a claw-like shoe extending rightward and leftward at a distal end of each of the magnetic pole teeth.

However, when the shoe is provided at the distal end of each of the magnetic pole teeth, a width of a slot opening portion becomes narrower than a slot width. Accordingly, there is a problem in that work of receiving the armature coils in the slots becomes complicated so that productivity is degraded.

As countermeasures against this problem, there is proposed the following method. Specifically, a shoe is provided as a separate part with respect to the magnetic pole tooth, and the magnetic pole tooth and the shoe part are coupled together through a pin serving as a pivot shaft, thereby obtaining a structure in which the shoe part is rotatable. Through adoption of this method, there can be achieved a structure of the armature core that keeps satisfactory workability in inserting the armature coils into the slots in such a manner that the shoe part is rotated in an axis center direction so as to increase the slot opening width (for example, see Patent Literature 1).

CITATION LIST

Patent Literature

[PTL 1] JP 2009-284707 A

SUMMARY OF INVENTION

Technical Problem

However, the related art has the following problems.

In the armature core described in Patent Literature 1, in order to rotate the shoe part with respect to the magnetic pole tooth, the magnetic pole tooth and the shoe part are coupled together through the pin. However, as the number of laminated steel sheets to be stacked increases, there is a higher risk in that the pin cannot be inserted straight due to misaligned lamination or slant lamination.

When the pin cannot be inserted straight, the pin is bent. That is, the pivot shaft is bent, and hence there may be a problem in that the shoe part is not rotated with respect to the magnetic pole tooth.

Further, the shoe part is small, and thus it is required that also a pin diameter be small. As a result, the pin is prone to break or bend. Accordingly, there are problems in that workability in inserting the pin is poor, and the pin breaks during rotation of the shoe part.

The present invention has been made in order to solve the above-mentioned problems, and has an object to obtain an armature core of a rotary electric machine capable of improving productivity of an armature while keeping satisfactory operating characteristics of the rotary electric machine.

Solution to Problem

According to one embodiment of the present invention, there is provided an armature core of a rotary electric machine, including: a back yoke having an annular shape; and a plurality of magnetic pole teeth protruding radially inward from an inner peripheral wall face of the back yoke, wherein each of the plurality of magnetic pole teeth includes at least one shoe having a claw-like shape and extending to both sides in a circumferential direction of the plurality of magnetic pole teeth or one side in the circumferential direction at a distal end of each of the plurality of magnetic pole teeth in a protruding direction thereof, wherein the at least one shoe extending to the both sides in the circumferential direction or the one side in the circumferential direction is provided as a shoe part being a separate part with respect to each of the plurality of magnetic pole teeth, wherein each of the plurality of magnetic pole teeth has an arc-shaped cutout, wherein the shoe part includes a circular portion, wherein each of the plurality of magnetic pole teeth and the shoe part are coupled together through fitting between the arc-shaped cutout and the circular portion, and wherein the shoe part is rotationally movable along a circumference of the circular portion with respect to each of the plurality of magnetic pole teeth with the circumference serving as a guide.

Advantageous Effects of Invention

According to the present invention, the armature core of the rotary electric machine includes the shoe provided as a separate part with respect to the magnetic pole tooth. The arc-shaped cutout is formed in the distal end of the magnetic pole tooth, and the shoe part includes the circular portion. Through fitting between the arc-shaped cutout and the circular portion, the magnetic pole tooth and the shoe part are coupled together. The shoe part is configured to be rotatable with respect to the magnetic pole tooth with a circumference of the circular portion serving as a guide. As a result, it is possible to obtain the armature core of the rotary electric machine capable of improving productivity of the armature while keeping satisfactory operating characteristics of the rotary electric machine.

DESCRIPTION OF EMBODIMENTS

A description is now given of an armature core of a rotary electric machine according to preferred embodiments of the present invention referring to the accompanying drawings.

First Embodiment

Figure 1:
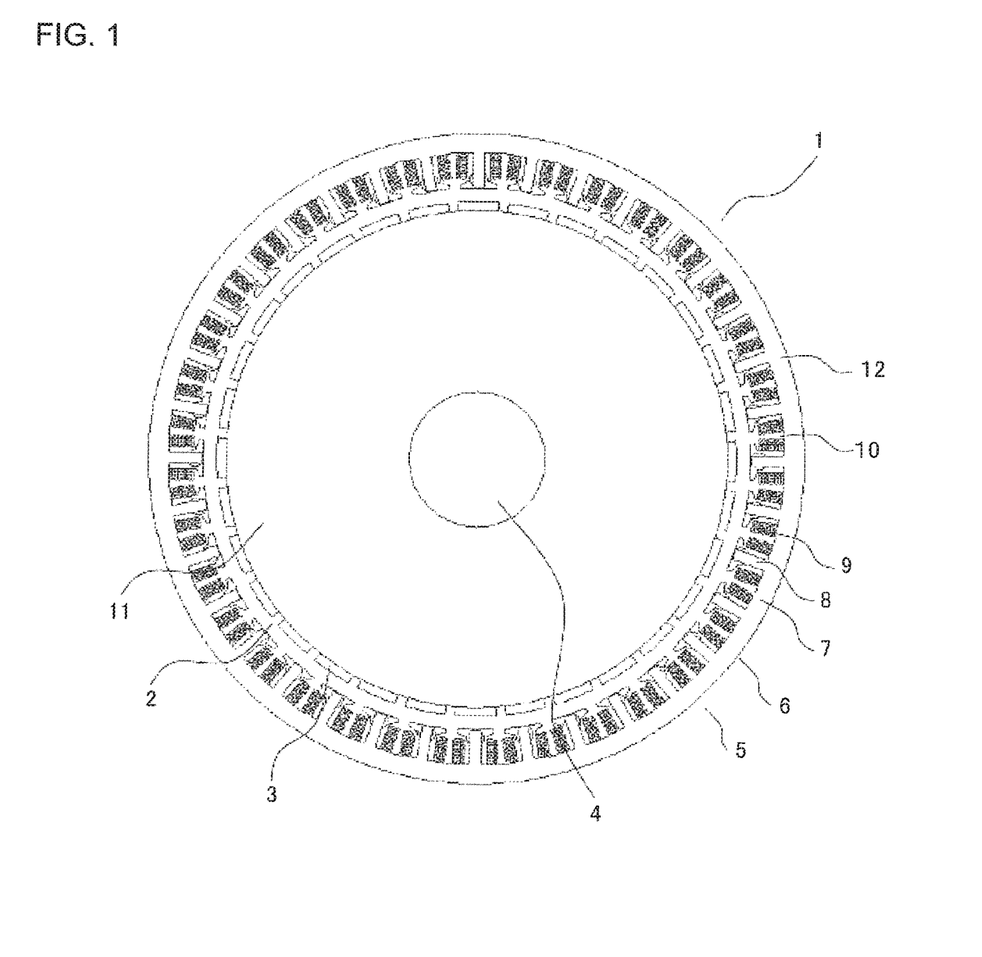
FIG. 1 is a plan view for illustrating a rotary electric machine according to a first embodiment of the present invention.

FIG. 1 is a plan view for illustrating a rotary electric machine according to a first embodiment of the present invention. In FIG. 1, a rotary electric machine 1 includes a rotor 2 and an armature 5. The rotor 2 is fixed to a rotary shaft 4 supported in a housing (not shown) so as to be rotatable, and is arranged in the housing. Meanwhile, the armature 5 is retained by the housing so as to surround the rotor 2 with a constant clearance between the rotor 2 and the armature 5.

The rotor 2 includes the rotary shaft 4, and a rotor core 11 that is inserted at an axis center position and fixed to the rotary shaft 4. Moreover, a plurality of magnets 3 are arranged on an outer peripheral face of the rotor core 11 at equal pitches in a circumferential direction.

The armature 5 includes an armature core 6 and armature coils 9. Further, the armature core 6 includes magnetic pole teeth 8. The magnetic pole teeth 8 protrude radially inward from an inner peripheral wall face of a back yoke 7 having an annular shape, and a plurality of magnetic pole teeth 8 are arranged at equal pitches in the circumferential direction. In FIG. 1, the armature core 6 including thirty-six magnetic pole teeth 8 is exemplified.

Meanwhile, the armature coils 9 are each configured as a coil produced by winding a conductive wire around each of the magnetic pole teeth 8 through an insulator (not shown). Further, spaces called slots 10 are defined between the adjacent magnetic pole teeth 8, and the armature coils 9 are received in the slots 10.

Figure 2:
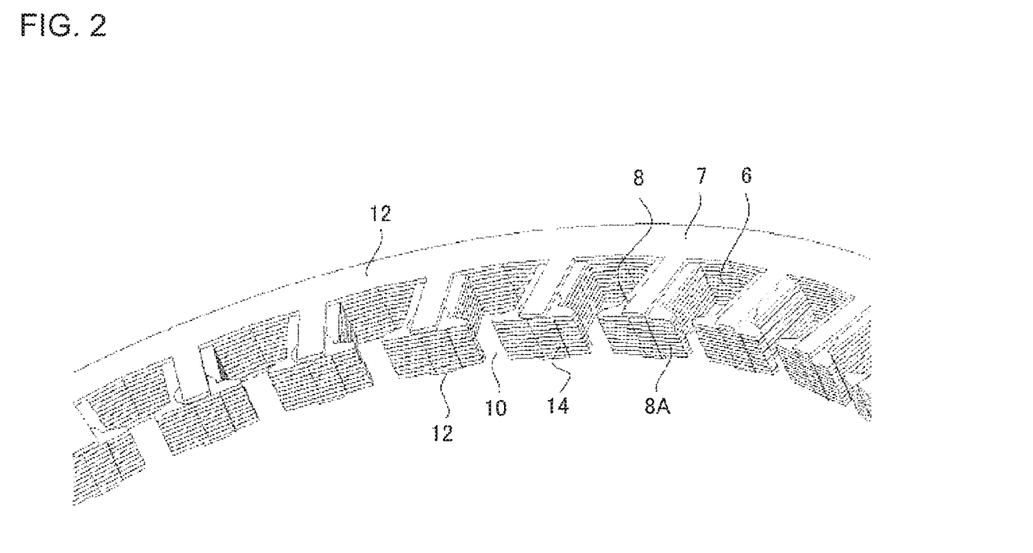
FIG. 2 is a perspective view for illustrating an armature core of the rotary electric machine according to the first embodiment of the present invention as seen from a radially inner side of the rotary electric machine.
Figure 3:
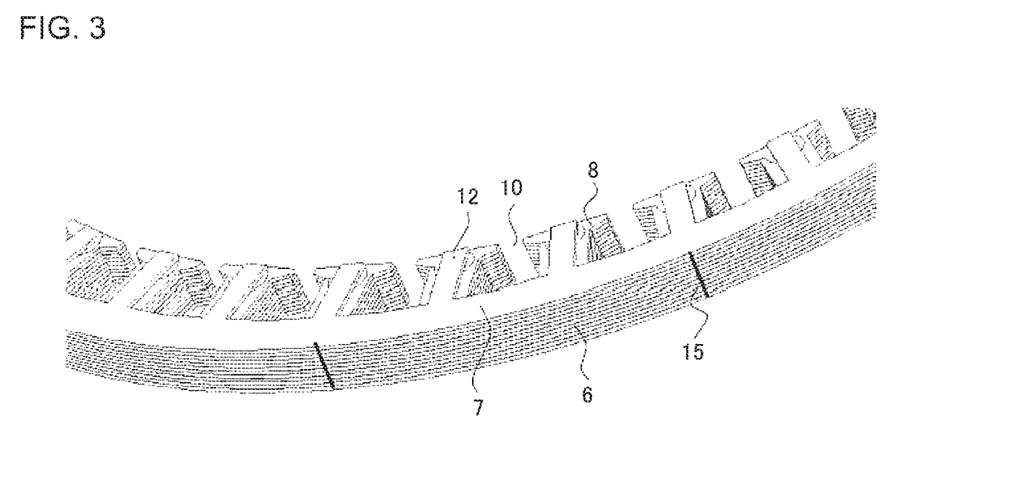
FIG. 3 is a perspective view for illustrating the armature core of the rotary electric machine according to the first embodiment of the present invention as seen from a radially outer side of the rotary electric machine.

FIG. 2 is a perspective view for illustrating the armature core of the rotary electric machine according to the first embodiment of the present invention as seen from a radially inner side of the rotary electric machine. Further, FIG. 3 is a perspective view for illustrating the armature core of the rotary electric machine according to the first embodiment of the present invention as seen from a radially outer side of the rotary electric machine. As illustrated in FIG. 2 and FIG. 3, the armature core 6 is formed by laminating thin-sheet-like steel sheets. An end sheet 12 is arranged on each of uppermost and lowermost sides of the lamination. Similarly to the armature core 6, the end sheet 12 includes the back yoke 7 having an annular shape, and the magnetic pole teeth 8.

Figure 4:
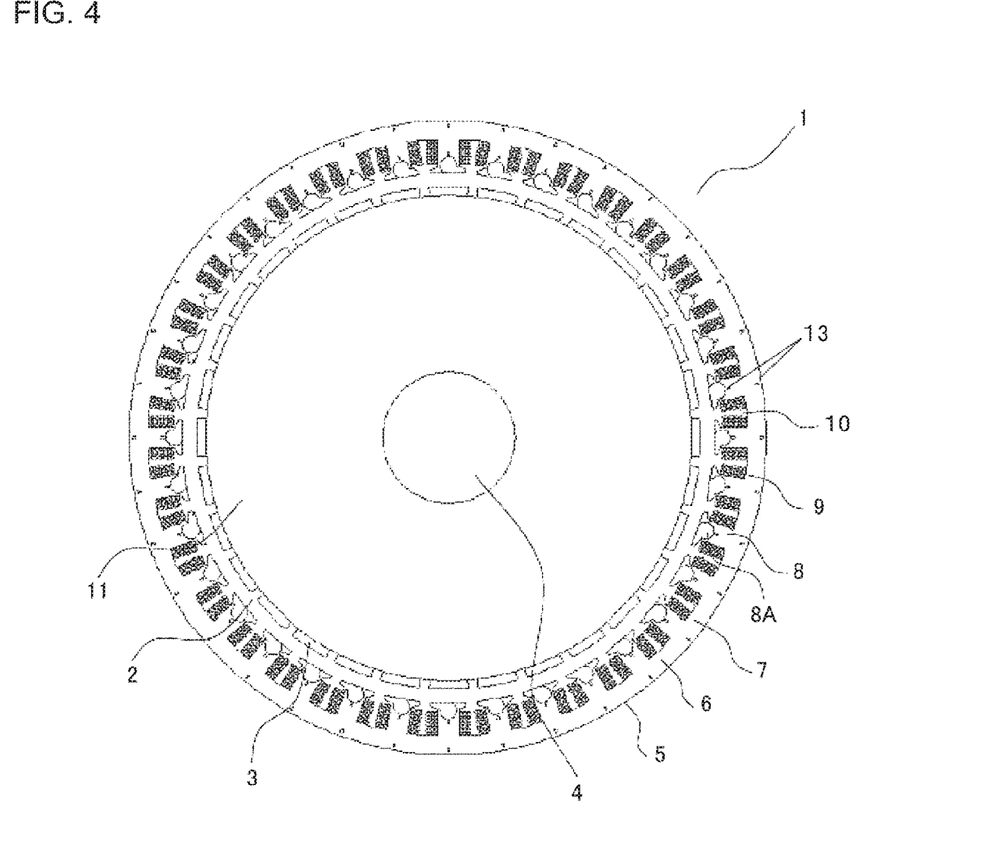
FIG. 4 is a plan view of the rotary electric machine from which only end sheets sandwiching a lamination of the armature core from upper and lower sides thereof are removed for ease of description of a structure of the armature core according to the first embodiment of the present invention.
Figure 5:
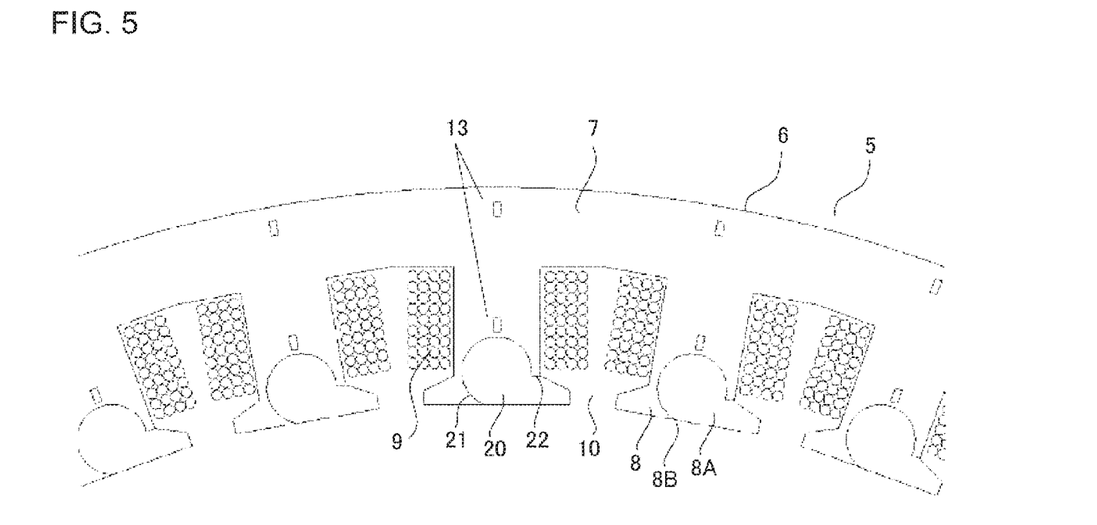
FIG. 5 is a partial enlarged view of an armature of the rotary electric machine according to the first embodiment of the present invention.
Figure 6:
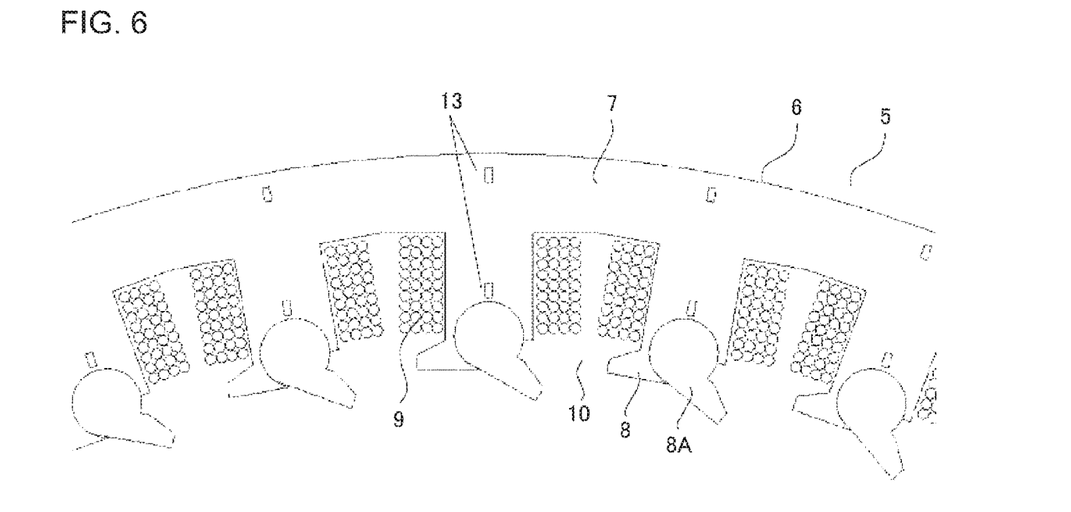
FIG. 6 is a partial enlarged view of the armature of the rotary electric machine according to the first embodiment of the present invention when shoe parts are rotated.

The laminated steel sheets of the armature core 6 are coupled together by crimps 13 illustrated in FIG. 4 to FIG. 6, which are described later. Further, the end sheet 12 is also coupled to the armature core 6 through formation of the crimps 13, or formation of a weld 15 or other coupling portion on an outer peripheral side of the armature. Here, the crimps 13 and the weld 15 or other coupling portion correspond to coupling means.

A shoe having a claw-like shape and extending to both sides in the circumferential direction is provided at a distal end of each of the magnetic pole teeth 8 in a protruding direction thereof. A portion of the shoe on one side in the circumferential direction with respect to the magnetic pole tooth 8 is provided as a shoe part 8A being a separate part. Similarly to the armature core 6, the shoe part 8A is formed by laminating thin-sheet-like iron sheets.

Here, with reference to a plan view of the rotary electric machine 1 and an enlarged view of the armature 5 in which only the end sheets 12 are omitted, detailed description is made of the armature core 6 according to the first embodiment. FIG. 4 is a plan view of the rotary electric machine from which only the end sheets sandwiching the lamination of the armature core from upper and lower sides thereof are removed for ease of description of a structure of the armature core according to the first embodiment of the present invention. Further, FIG. 5 is a partial enlarged view of the armature 5 of the rotary electric machine according to the first embodiment of the present invention. Moreover, FIG. 6 is a partial enlarged view of the armature 5 of the rotary electric machine according to the first embodiment of the present invention when the shoe parts are rotated.

Each of the magnetic pole teeth 8 of the armature core 6 has an arc-shaped cutout 21 at the distal end in the protruding direction. The arc-shaped cutout 21 in the first embodiment has a circumference portion having a central angle equal to or larger than 180°. The circumference portion is formed to have the central angle equal to or larger than 180° in this manner with the aim of preventing the shoe part 8A from slipping off the magnetic pole tooth 8 toward the radially inner side.

The shoe part 8A includes a claw-like shoe portion and a circular portion 20. The circular portion 20 is fixed to the arc-shaped cutout 21 in a fitted manner, and can perform rotational movement with respect to the magnetic pole tooth 8 with a circumference portion of the circular portion 20 serving as a guide. During rotation of the shoe part 8A, the circumference portion is always held in contact with the arc-shaped cutout 21 in a central angle range equal to or larger than 180°.

Further, the end sheets 12 sandwich both of the magnetic pole teeth 8 and the shoe parts 8A from the upper and lower sides of the lamination. Therefore, owing to fitting between the arc-shaped cutout 21 and the circular portion 20 and the end sheets 12, each of the shoe parts 8A is retained in a rotationally movable state without slipping off the magnetic pole tooth 8.

The shoe part 8A in the first embodiment does not require a separate part such as a pin, which serves as a pivot shaft. Accordingly, assembly work for the armature core 6 is simplified. Further, the arc-shaped cutout 21 and the circular portion 20, which play a role of the pivot shaft, can be configured to have sufficient sizes for the shoe part 8A. Accordingly, there is obtained a structure which is less liable to cause breakage of the pivot shaft or other failure.

When the armature coils 9 are inserted into the slots 10, respectively, each shoe part 8A is rotationally moved so that an opening width of the slot 10 can be increased. Under a state in which the opening width of the slot 10 is increased in this manner, insertion work for the armature coil 9 can easily be performed.

After the insertion work, the shoe part 8A is rotationally moved in a direction opposite to the direction of increasing the opening width, and an abutment face 22 of the shoe part 8A is brought into abutment against the magnetic pole tooth 8 so as to be positioned, thereby closing an opening portion of the slot 10. After that, for example, through welding of a boundary face 8B between the shoe part 8A and the magnetic pole tooth 8, the shoe part 8A is fixed to the magnetic pole tooth 8. Thus, after insertion of the armature coil 9, the shoe part 8A can be arranged and fixed so that the claw-like shape of the shoe part 8A extends in the circumferential direction. As a result, satisfactory operating characteristics of the rotary electric machine 1, for example, reduced torque ripple can be obtained.

As described above, according to the armature core 6 in the first embodiment of the present invention, productivity of the armature 5 can be improved while keeping satisfactory operating characteristics of the rotary electric machine 1. Moreover, the structure which is less liable to cause breakage of component parts at the time of production work can be achieved.

Second Embodiment

Figure 7:
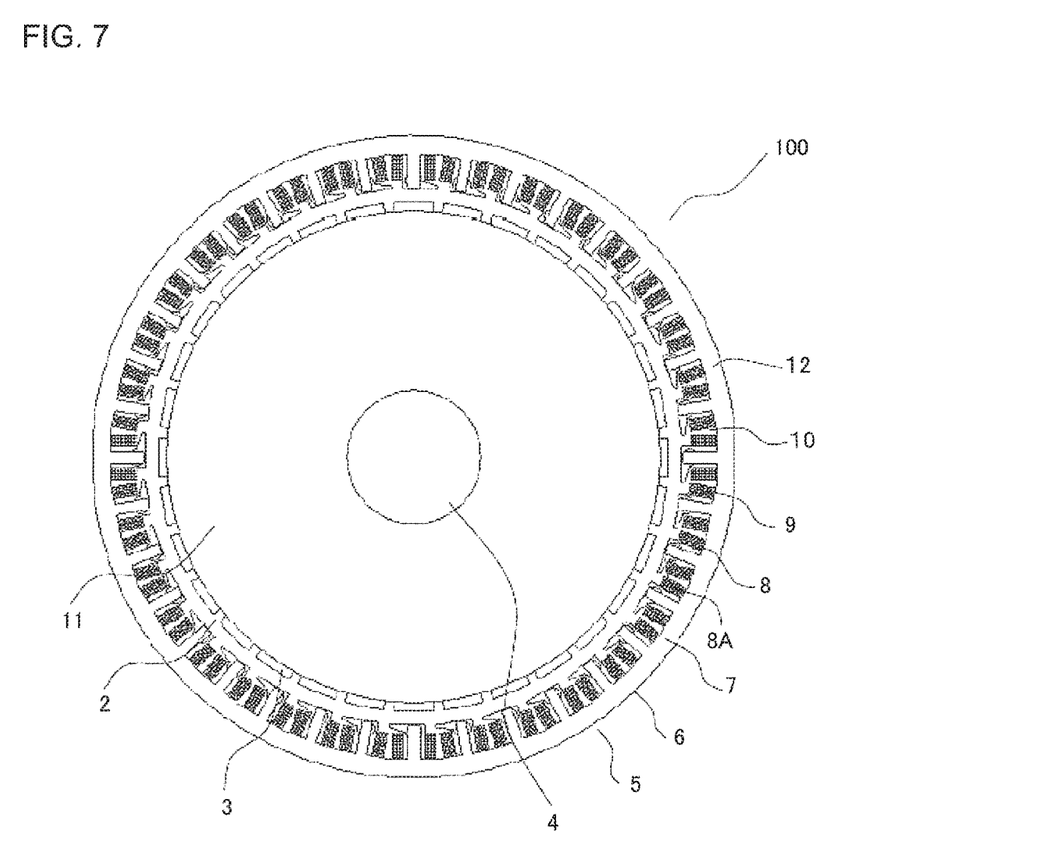
FIG. 7 is a plan view for illustrating a rotary electric machine according to a second embodiment of the present invention.
Figure 8:
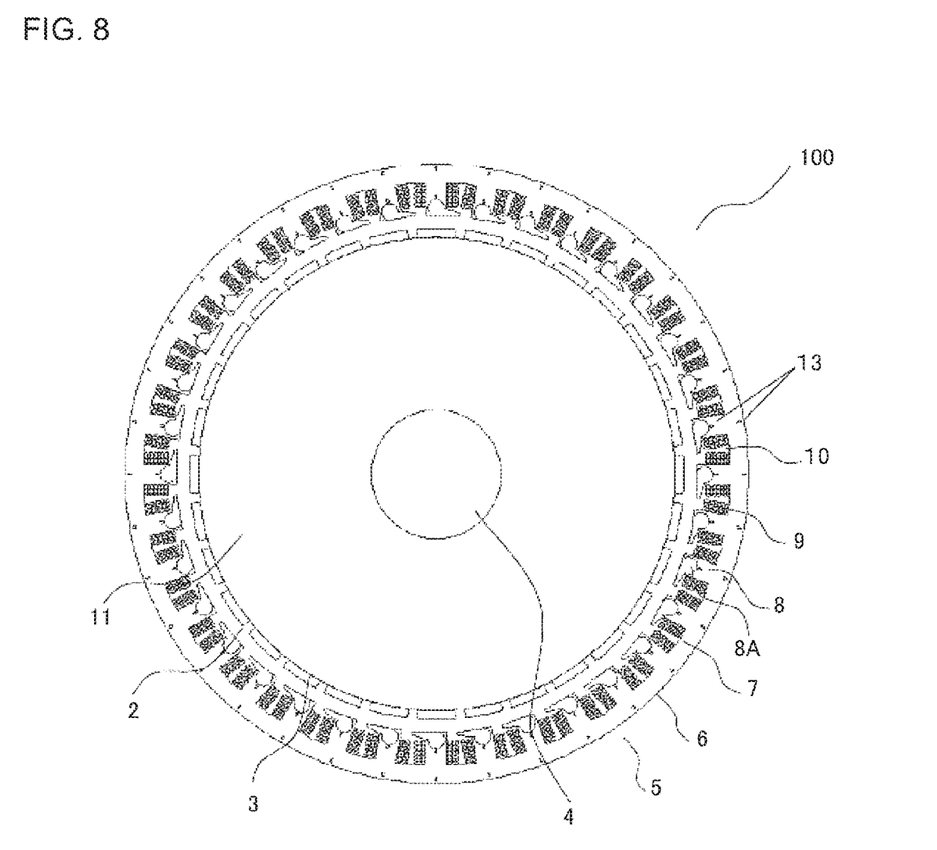
FIG. 8 is a plan view of the rotary electric machine according to the second embodiment of the present invention, from which only the end sheets are removed.
Figure 9:
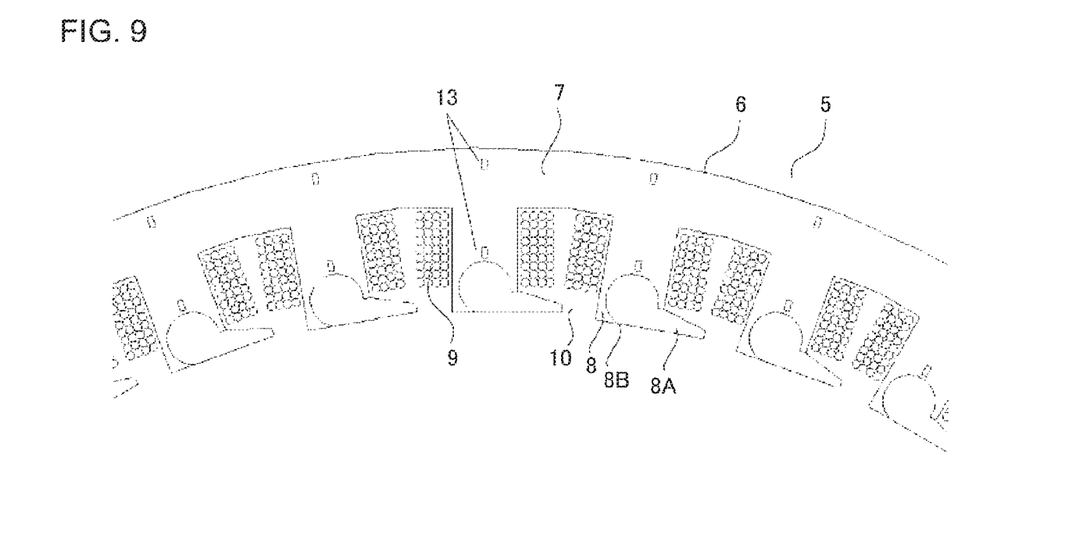
FIG. 9 is a partial enlarged view of an armature of the rotary electric machine of FIG. 8 according to the second embodiment of the present invention.

FIG. 7 is a plan view for illustrating a rotary electric machine according to a second embodiment of the present invention. FIG. 8 is a plan view of the rotary electric machine according to the second embodiment of the present invention, from which only the end sheets 12 are removed. Further, FIG. 9 is a partial enlarged view of the armature 5 of the rotary electric machine of FIG. 8 according to the second embodiment of the present invention.

A rotary electric machine 100 according to the second embodiment has the same structure as that of the rotary electric machine 1 according to the first embodiment of the present invention except that a portion of the shoe on another side in the circumferential direction of the magnetic pole teeth 8 is not provided. Specifically, in the previous first embodiment, each of the magnetic pole teeth 8 includes the claw-like shoe extending rightward and leftward at the distal end of each of the magnetic pole teeth 8. In contrast, in the second embodiment, the claw-like shoe that is formed of the shoe part 8A and extends in only one direction is provided.

In the second embodiment, the portion of the shoe on another side in the circumferential direction of the magnetic pole teeth 8 (that is, the portion of the shoe extending leftward in FIG. 9 if provided) is omitted. Accordingly, when the shoe part 8A is rotationally moved, the opening width of the slot 10 can be further increased as compared to that in the previous first embodiment. As a result, as compared to the case of the previous first embodiment, more satisfactory workability can be attained in inserting the armature coil 9 into the slot 10.

Third Embodiment

Figure 10:
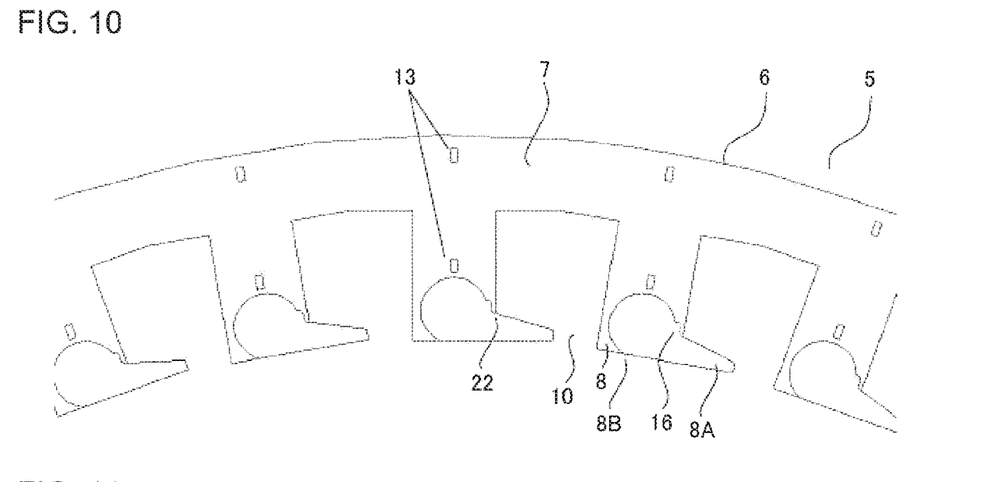
FIG. 10 is a partial enlarged view of an armature of a rotary electric machine according to a third embodiment of the present invention.
Figure 11:
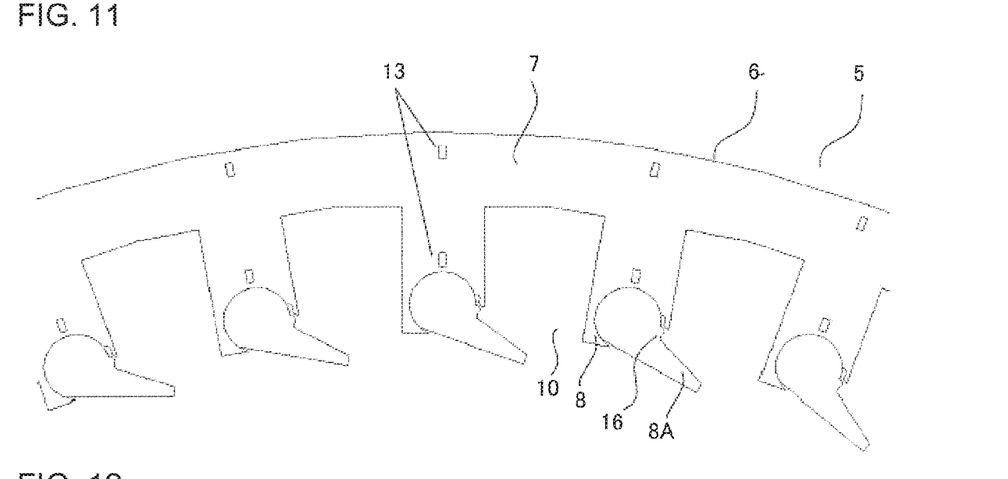
FIG. 11 is a partial enlarged view of the armature of the rotary electric machine according to the third embodiment of the present invention when the shoe parts are rotated.

FIG. 10 is a partial enlarged view of an armature 5 of a rotary electric machine according to the third embodiment of the present invention. Further, FIG. 11 is a partial enlarged view of the armature 5 of the rotary electric machine according to the third embodiment of the present invention when the shoe parts are rotated. The rotary electric machine according to the third embodiment has the same structure as that of the rotary electric machine 100 according to the previous second embodiment except that a press-fitting portion 16 is provided between the magnetic pole tooth 8 and the shoe part 8A.

In the third embodiment, similarly to the previous first and second embodiments, the shoe part 8A is rotationally moved while the arc-shaped cutout 21 and the circular portion 20 are fitted to each other. In this manner, the opening width of the slot 10 is increased, and satisfactory workability is attained in inserting the armature coil 9.

Meanwhile, the third embodiment has the following structure as a unique structure. Specifically, in order to close the opening of the slot 10, when the shoe part 8A is rotationally moved in the direction opposite to the direction of increasing the opening width so as to be positioned by bringing the abutment face 22 into abutment against the magnetic pole tooth 8, the magnetic pole tooth 8 and the shoe part 8A are press-fitted and fixed to each other through the press-fitting portion 16.

In the previous first and second embodiments, a step of, for example, performing welding on the boundary face 8B to fix the shoe part 8A to the magnetic pole tooth is required. In contrast, in the third embodiment, through adoption of the fixing method using the press-fitting portion 16, the welding step is not required. That is, more satisfactory workability can be attained in producing the armature 5.

Fourth Embodiment

Figure 12:
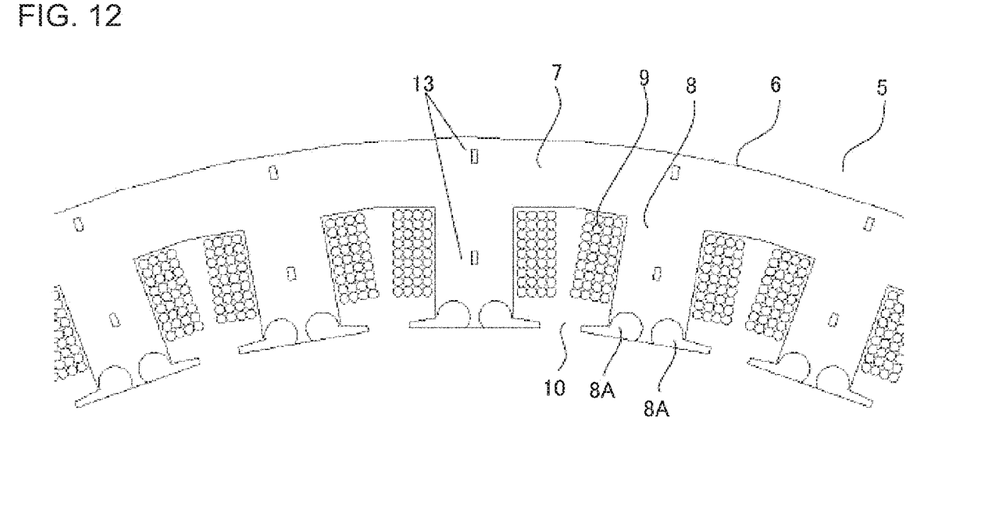
FIG. 12 is a partial enlarged view of an armature of a rotary electric machine according to a fourth embodiment of the present invention.

In the previous first to third embodiments, description is made of the case in which one shoe part 8A is provided for one magnetic pole tooth 8. In contrast, in a fourth embodiment, description is made of a case in which two shoe parts 8A are provided for one magnetic pole tooth 8. FIG. 12 is a partial enlarged view of the armature 5 of a rotary electric machine according to the fourth embodiment of the present invention. As illustrated in FIG. 12, even through adoption of the structure in which one magnetic pole tooth 8 includes two shoe parts 8A, the effect of the present invention that improves productivity of the armature can be achieved while keeping satisfactory operating characteristics of the rotary electric machine.

The shoe part 8A in each of the above-mentioned first to fourth embodiments is formed of laminated steel sheets. Therefore, interlaminar portions of the shoe part 8A may be coupled together by adding the crimps 13 or a weld 14 or other coupling portion to the shoe part 8A.

Further, in the above-mentioned first to fourth embodiments, description is made of the case in which the armature core 6 and the shoe part 8A are each formed of laminated steel sheets. However, the present invention is not limited to this configuration. The armature core 6 and the shoe part 8A may each be formed of a block member.

Further, in the above-mentioned first to fourth embodiments, description is made of the case in which the rotary electric machine is of an inner rotor type. However, even in armature cores of rotary electric machines of an outer rotor type and an axial gap rotor type, in general, a shoe having a claw-like shape and extending to both sides in a circumferential direction of a magnetic pole tooth is provided at a distal end side of the magnetic pole tooth in a protruding direction thereof. Accordingly, similar effects can be obtained by employing the present invention to armature cores of rotary electric machines of various types.

REFERENCE SIGNS LIST 1, 100 rotary electric machine, 6 armature core, 7 back yoke, 8 magnetic pole tooth, 8A shoe part, 10 slot, 12 end sheet, 13 crimp (coupling means), 14 weld (coupling means), 16 press-fitting portion, 20 circular portion, 21 arc-shaped cutout

The invention claimed is:

1. An armature core of a rotary electric machine, comprising:
a back yoke having an annular shape; and
a plurality of magnetic pole teeth protruding radially inward from an inner peripheral wall face of the back yoke,
wherein each of the plurality of magnetic pole teeth includes at least one shoe having a claw-like shape and extending to both sides in a circumferential direction of the plurality of magnetic pole teeth or one side in the circumferential direction at a distal end of each of the plurality of magnetic pole teeth in a protruding direction thereof,
wherein the at least one shoe extending to the both sides in the circumferential direction or the one side in the circumferential direction is provided as a shoe part being a separate part with respect to each of the plurality of magnetic pole teeth,
wherein each of the plurality of magnetic pole teeth has an arc-shaped cutout,
wherein the shoe part includes a circular portion,
wherein each of the plurality of magnetic pole teeth and the shoe part are coupled together through fitting between the arc-shaped cutout and the circular portion, the circular portion of the shoe part being in contact with the arc-shaped cutout, and
wherein the shoe part is rotationally movable along a circumference of the circular portion with respect to each of the plurality of magnetic pole teeth with the circumference serving as a guide.

2. The armature core of a rotary electric machine according to claim 1, wherein during the rotational movement of the shoe part, the arc-shaped cutout and the circular portion are always held in contact with each other in a central angle range of the circumference equal to or larger than 180°.

3. The armature core of a rotary electric machine according to claim 1, further comprising end sheets arranged on upper and lower sides of the armature core, respectively,
wherein the end sheets are coupled to the armature core by coupling means, and are configured to sandwich and fix both the plurality of magnetic pole teeth and the shoe parts from the upper and lower sides.

4. The armature core of a rotary electric machine according to claim 1, further comprising a press-fitting portion provided between each of the plurality of magnetic pole teeth and the shoe part,
wherein each of the plurality of magnetic pole teeth and the shoe part are positioned and fixed to each other through press-fitting under a state in which, at one end of a range of the rotational movement, an opening portion of a slot between adjacent magnetic pole teeth is narrowed as a result of the rotational movement.

5. The armature core of a rotary electric machine according to claim 1,
wherein the armature core and the shoe part are formed by laminating thin-sheet-like steel sheets, and
wherein interlaminar portions of the armature core are coupled together by the coupling means.

6. The armature core of a rotary electric machine according to claim 5, wherein interlaminar portions of the shoe part are coupled together by the coupling means.

* * * * *